«United States Patent» [15] 3,658,165
Mankau et al. [45] Apr. 25, 1972

[54] PLATEN TURNING KNOB WITH A PAPER EDGE INDICATOR SCALE

[72] Inventors: Dieter Mankau; Werner Duddey, both of Wilhelmshaven, Germany

[73] Assignee: Olympia Werke AG, Wilhelmshaven, Germany

[22] Filed: May 6, 1970

[21] Appl. No.: 35,073

[30] Foreign Application Priority Data

May 7, 1969 Germany..................P 19 23 239.4

[52] U.S. Cl...........................................197/189
[51] Int. Cl. ........................................B41j 29/44
[58] Field of Search..........................197/187, 189

[56] References Cited

UNITED STATES PATENTS

| | | |
|---|---|---|
| 2,633,969 | 4/1953 | Unterweiser............................197/189 |
| 3,343,643 | 9/1967 | Unterweiser............................197/189 |
| 3,349,890 | 10/1967 | Russell...................................197/189 |
| 1,757,541 | 5/1930 | Murdock................................197/189 |
| 2,505,769 | 5/1950 | Hassell...................................197/189 |
| 2,718,956 | 9/1955 | Lepkowski..............................197/189 |

Primary Examiner—Ernest T. Wright, Jr.
Attorney—Spencer & Kaye

[57] ABSTRACT

A platen turning knob has a transparent cylinder with knurling on a portion of its peripheral surface. An independently rotatable insert member with a paper edge indicating scale provided on its peripheral surface is arranged inside the cylinder. The knob and insert member are slipped onto the end of the roller shaft, and a bar member is snapped onto the end of the shaft to retain the knob and insert member in position.

4 Claims, 3 Drawing Figures

INVENTORS
Dieter Mankau
Werner Duddey

BY *Spencer & Kaye*
ATTORNEYS.

PLATEN TURNING KNOB WITH A PAPER EDGE INDICATOR SCALE

BACKGROUND OF THE INVENTION

The present invention relates to a platen turning knob for typewriters and similar machines that has a scale provided thereon for indicating the location of the upper and lower edges of a sheet of paper in the machine.

It has long been known to use an indicator scale to indicate the position of the upper and lower edges of the sheet of paper in a typewriter.

These indicator scales are known as so-called paper-end indicators. One example of such an indicator is a metal ring bearing the indicator scale adjustably attached to the platen.

Another known indicator scale is made of an expansible material for attachment to the platen knob for rotation with the platen knob and is settable and adjustable with respect to a fixed marker.

All of these known devices have the disadvantage, however, that their setting might unintentionally be changed when the platen knob is being manipulated.

In addition, the metal rings attached to the platen itself require an undue amount of space. Their indicator scales are, moreover, not always as clearly visible as desired.

SUMMARY OF THE INVENTION

It is, therefore, an object of the present invention to provide an indicator device which eliminates the disadvantages mentioned above, as well as other known drawbacks, and which meets practical requirements.

This object is accomplished according to the present invention by providing a platen knob containing an independently rotatable insert member having an indicator scale on a portion of its surface.

Among the advantages of the present invention is that the indicator scale is disposed in a clearly visible and easily readable position and, most of all, that it can not inadvertently be reset when the platen knob is being manipulated.

Further features of the present invention will be apparent from the following description and the drawing.

DESCRIPTION OF THE PREFERRED EMBODIMENTS

Figure 2:
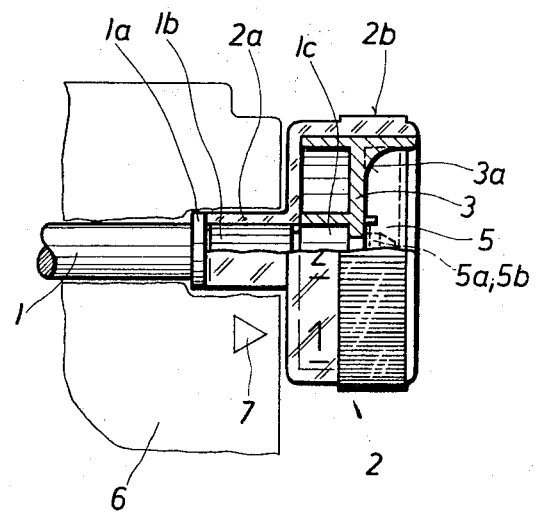
FIG. 2 is a side elevation view, partly in cross section, showing the platen knob according to the present invention and a suitable platen shaft for mounting the platen knob, together with a portion of a typewriter.
Figure 1:
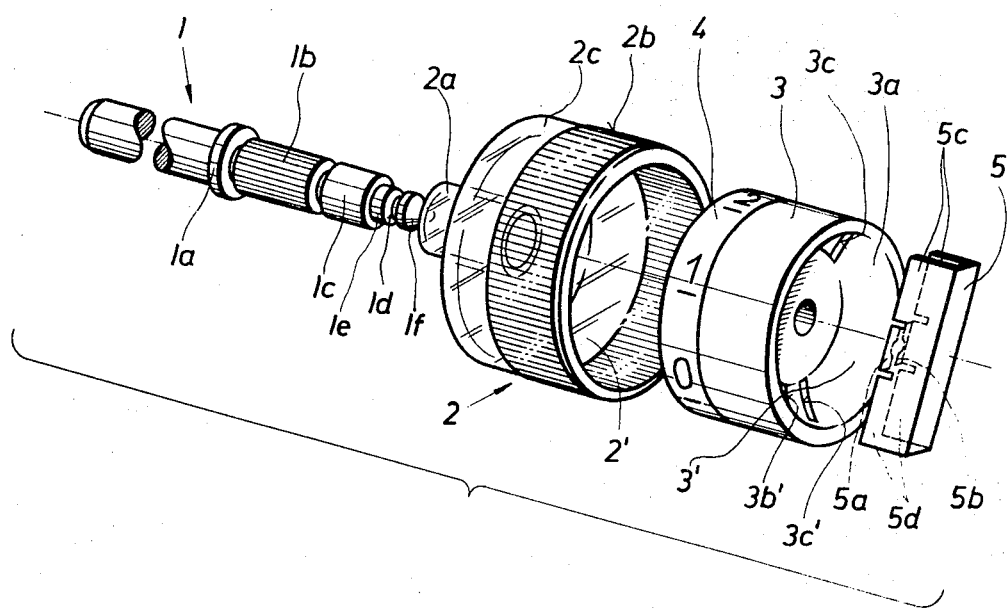
FIG. 1 is an exploded view showing the platen knob of the present invention and a suitable platen shaft for mounting the platen knob.

FIGS. 1 and 2 show a known typewriter roller, or platen, shaft 1 which has a collar 1a and a straight knurled section 1b. Platen shaft 1 also has a cylindrical portion 1c, a reduced diameter section 1e near its outer end, and a groove 1d in section 1e. The tip 1f of section 1e is tapered. A platen knob 2 having a housing 2' is mounted on the shaft 1. The housing 2' of the platen knob 2 is constructed, as by molding of a suitable transparent material, and is shaped like a cylinder having an open end and a closed end having a small diameter opening therein, with a smaller diameter co-axial cylinder 2a attached in the opening at the closed end and in communication with the interior of the larger cylinder.

Housing 2' is firmly attached to shaft 1 by sliding the smaller cylinder 2a over the knurled section 1b of shaft 1 until it abuts collar 1a. The inner surface of cylinder 2a is suitably formed to drivingly engage section 1b. The portion 2b of the outer peripheral surface of housing 2' that is adjacent its open end is straight knurled to provide a gripping surface to turn the platen, and the remaining portion 2c of the outer peripheral surface of housing 2 is left smooth.

A cylindrical insert member 3 is so dimensioned that it can slide into the interior of housing 2' and rest on portion 1c of shaft 1 so as to be freely rotatable. The portion of the outer peripheral surface of insert member 3 adjacent the closed end of housing 2' is provided with an indicator scale 4 which has a circumferentially spaced series of numbers. This arrangement of the indicator scale 4 results in its being disposed beneath the smooth portion 2c of housing 2'. In this manner, the numbers on the indicator scale 4 can be clearly read through the housing 2'. Insert member 3 has a recess 3' having rounded corner 3a in the end of member 3 adjacent the open end of housing 2'. Recess 3' further has a pair of recesses only one of which, 3c, is visible and a diametrically opposite pair of recesses 3b' and 3c' in the rounded corner portion 3a.

Figure 3:
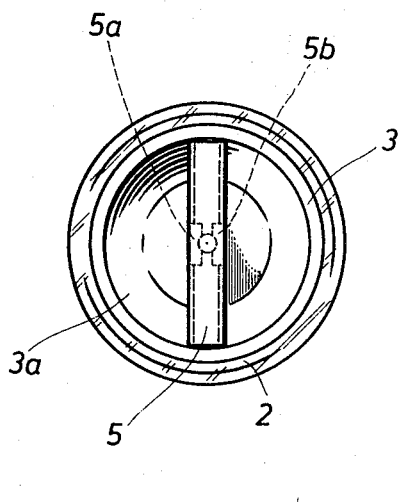
FIG. 3 is an end elevation view of the platen knob according to the present invention.

A U-shaped bar 5 is constructed of a suitable resilient material and is dimensioned to fit into the recess which is not shown and the recesses 3c and 3b', 3c' with its respective end portions 5c and 5d. Bar 5 also has resilient portions 5a and 5b, which are shaped to fit over end portion 1f and snap into groove 1d of shaft 1 (see FIGS. 1 and 3). This permits bar 5 to serve as a spring clip for permanently retaining insert member 3 in housing 2'.

When the platen turning knob described above is used, for example, on a typewriter 6, a sheet of paper is inserted in the known manner between the platen and the paper guide rollers only to such an extent that the paper comes into contact with the paper guide rollers of the typewriter or similar machine. Subsequent rotation of the platen pulls the paper between the platen and the paper guide rollers until it becomes visible in front of the platen.

Once the edge of the sheet of paper is visible in front of the platen, the indicator scale 4 on the insert member 3 is indexed, by means of the bar 5, with a marker 7 disposed, for example, on the carriage frame of the machine.

The appropriate identifying number for the particular size of paper being used is determined in a known manner from a table provided for this purpose and is the number on the indicator scale 4 set opposite the marker 7.

Thereafter, the member 3 will rotate with knob 2 as long as bar 5 is not disturbed. The recessed position of bar 5 substantially eliminates the danger of any accidental bar movement.

When using large sheets of paper and small diameter platens; it is possible that the identifying number determined from the table will come into line with the marker 7 several times as the sheet of paper moves through the machine. This is immaterial, however, since the approximate position of the portion of the paper already typed will indicate whether the paper is in the end position or in an intermediate position.

It will be understood that the above description of the present invention is susceptible to various modifications, changes and adaptations, and the same are intended to be comprehended within the meaning and range of equivalents of the appended claims.

We claim:

1. A platen turning knob comprising: an independently rotatable insert member with a scale thereon for indicating the upper and lower edges of a sheet of paper; a housing member of a transparent material and having a portion of its outer peripheral surface knurled for gripping; said insert member having two ends with one end provided with a recess having rounded sides; and a bar member which fits into said recess; said housing member being attached to a platen shaft for rotation with the platen shaft, said insert member being rotatably mounted on the platen shaft and said bar member being constructed in a U-shaped of resilient material, and including two legs with a portion of each leg formed to engage a groove on the platen shaft, said bar member serving for rotating said insert member.

2. A platen knob as defined in claim 1, wherein said insert member has two diametrically opposite pairs of recesses in the rounded corner of the recess defined in the end of said insert member, each one of each pair of recesses accepting and retaining a portion of said bar member.

3. A platen knob as defined in claim 2, wherein said scale is arranged on said insert member to be clearly visible through said transparent housing.

4. A platen knob as defined in claim 3, wherein said housing member is a hollow cylinder open at one end and substantially closed at the other end, and said insert member is a cylinder which fits within the hollow interior defined by said housing member.

* * * * *